3,086,971
PROCESS OF CROSS-LINKING STARCH WITH HEXAHYDRO - 1,3,5 - TRIS - ACRYLYL - s - TRI-AZINE
Donald Trimnell, Granite City, Ill., Chim P. Patel, St. Louis, Mo., and Jack F. Johnston, Granite City, Ill., assignors, by mesne assignments, to Union Starch & Refining Co., Inc., Columbus, Ind., a corporation of Indiana
No Drawing. Filed Sept. 29, 1959, Ser. No. 843,063
4 Claims. (Cl. 260—233.3)

The present invention relates generally to starch derivatives, and more particularly to new high viscosity water soluble starch products, and to a new method for producing such derivatives from starch. Specifically, the present invention pertains to thick and thick-thick boiling starches obtained by reacting starch with a cross linking agent.

Among the objects of the present invention is to provide new thick and thick-thick boiling starches and a new method of producing the same, especially from unmodified starch. More particularly it is an object to provide thick and thick-thick boiling starches which are maintained at a substantially constant viscosity during long periods of cooking, and a new method for producing the same, especially from unmodified starch (such as obtained from corn).

This invention is based on the discovery that new thick and thick-thick boiling starches can be produced from starch, by reaction with hexahydro-1,3,5-tris-acrylyl-s-triazine in the presence of a catalyst. The said triazine compound has three "active centers" whereby each molecule of hexahydro-1,3,5-tris-acrylyl-s-triazine can theoretically undergo polymerization at three different sites in the presence of a suitable catalytic system and/or can react with the starch granule to form a maximum of three cross-linked starch chains per molecule of said hexahydro-1,3,5-tris-acrylyl-s-triazine employed.

Briefly, the present invention comprises reacting a relatively small amount of hexahydro-1,3,5-tris-acrylyl-s-triazine with starch, especially unmodified starch (as obtained from corn). The conditions which affect the reaction, more or less, are the pH, time, temperature, catalyst composition and concentration, Baumé of starch slurry, and concentration of tri-functional monomer.

In following the teachings of the present invention, a starch slurry, for example, unmodified corn starch granules and water, at a temperature of about 90°–130° F. and with a Baumé of 20–22° Bé., is treated with a base or acid to adjust the pH thereof to preferably between about 4 to 6. The starting pH of the slurry is usually in the neighborhood of about 3–5 and will depend upon the source of the corn, the time of the year, and conditions in the plant which produces the slurry. Any base or acid may be used which will adjust the pH to a suitable level, such as sodium carbonate ($Na_2CO_3$), hydrogen chloride (HCl), or the like. It should be borne in mind that the base or acid, per se, does not react to "modify" the starch, but instead only adjusts the pH of the slurry to prepare the latter for the addition of the reactant and catalytic system and the reaction cycle. The density of the slurry is not unduly critical and may range from about 17° to about 24° Baumé; this is the preferred range of Bé. of slurries as they come from the conventional commercial equipment.

After the slurry has been adjusted to a suitable pH, specifically to between pH 4 and 6, a catalytic mixture consisting of a chemical oxidizing agent and of a chemical reducing agent is added. A catalytic mixture, consisting of potassium persulfate ($K_2S_2O_8$) as the oxidizing agent, is very satisfactory and may be added in quantities such that the quantity of potassium persulfate ($K_2S_2O_8$) approximates 0.010–0.040% of the dry substance weight of the starch in the slurry and the quantity of sodium bisulfite ($NaHSO_3$) approximates 0–0.015% of the dry substance weight of the starch in the slurry. (When potassium persulfate is added as the oxidizing agent no reducing agent is required.) Subsequently, a quantity of the reactant, hexahydro-1,3,5-tris-acrylyl-s-triazine, for example, about 0.02–0.20% of the dry substance weight of starch in the starch slurry, is added in the form of a dispersion in water. Other oxidizing agents, for example, the alkali metal and ammonium persulfates, permanganates, bromates, chlorates and dichromates may be substituted for the potassium persulfate.

The mixture is then allowed to react at the selected pH (between 4 and 6) for a controlled time, between one-half to seven hours, whereby the cross-linking of the starch chains takes place through the reaction of the three so-called "active centers" of each hexahydro-1,3,5-tris-acrylyl-s-triazine molecule.

The process is especially suited for the treatment of unmodified corn starches but is also suitable for the production of high viscosity starches from other starches such as wheat, rice, sorghum, potato, oat, arrowroot and barley starches. The treatment as it is applied to unmodified starches is preferred because it eliminates the necessity of a pretreatment to produce the modified starch; however, the treatment of starches which have been modified is not precluded.

Examples of variables that may be manipulated or controlled to regulate the reaction and the type of resultant product, include, the concentration of hexahydro-1,3,5-tris-acrylyl-s-triazine, the nature and concentration of the catalytic system, the pH, the temperature of the reaction, and the time of reaction. The most sensitive of these variables appear to be pH, the nature and concentration of the catalytic system, and the concentration of the hexahydro-1,3,5-tris-acrylyl-s-triazine. When these variables are predetermined the time of reaction is not too critical, as will be shown by results using the C.I.V. (Corn Industries' Viscometer), indicating that the reaction is substantially complete after one-half hour through the constancy of results obtained in the interval of one-half to seven hours. The temperature should be between about 90° F. and 130° F. However, the best viscosities are obtained at the higher temperatures. The ° Bé. of the starch slurry within the range specified appears to have no influence upon the extent of the reaction.

By controlling the main variables, a starch can be produced which, upon cooking, provides a relatively low viscosity thick boiling starch, or a relatively high viscosity thick-thick boiling starch. For example, if a relatively very small amount (for example 0.025 to 0.050%) of reactant is used, the resultant product produces a thick boiling starch of relatively low viscosity. If the amount of reactant is increased to about 0.075 to 0.200%, for example, a relatively high viscosity thick-thick boiling starch results. It is suspected that the aggregates produced by the cross-linking of the hexahydro-1,3,5-tris-acrylyl-s-triazine polymer and the starch chains increase in size, and help to produce a more viscous starch.

After the reaction, the resultant product can be diluted with water to approximately 17 degrees Baumé, filtered, dried and packaged.

The following examples further illustrate the method of carrying out the invention and are also tabulated to show the effect on the viscosity of the resultant starch product of various amounts of hexahydro-1,3,5-tris-acrylyl-s-triazine, of different pH values, of time, of temperature, and of the concentration and nature of the catalytic system, series of runs were made varying the amount of hexahydro-1,3,5-tris-acrylyl-s-triazine between 0.02 and 0.20% of the dry substance weight of starch in the slurry, varying the pH of the starch slurry between 3 and 7, varying the time of reaction between 1 and 7 hours, varying the temperature between 110° and 120° F., and varying the concentration of potassium persulfate between 0.010 and 0.040% and sodium bisulfite between zero and 0.015% of the dry substance weight of starch in the catalyst. It has been found that potassium persulfate has the ability to catalyze the reaction when used alone. However, the reaction is improved when sodium bisulfite is added in addition to the potassium persulfate.

*Example 1*

A corn starch slurry of about 22° Bé. and about 115° F. was provided, and sodium carbonate added to raise the pH to 5.0. A quantity of hexahydro-1,3,5-tris-acrylyl-s-triazine equivalent to about 0.1% of the dry substance weight of starch in the slurry was mixed with water and added to the slurry. At the same time a quantity of potassium persulfate equivalent to 0.0125% and of sodium bisulfite equivalent to 0.0125% of the dry substance weight of starch in the slurry was added directly in the granular form. When these substances were mixed therein, a reaction occurred which caused the pH level to drop to 4.5 after one hour, and the pH was then returned to the selected level of 5.0 by the addition of powdered sodium carbonate. Subsequently the starch slurry was diluted to about 17° Bé. with hot water, raising the temperature of the slurry to 120–125° F. During the next hour the slurry was filtered, sent to the drier, and finally packaged.

It is well known that the viscosity of different batches of unmodified pearl starch, when cooked, is not uniform, primarily because of the variations in the characteristics of the corn used in producing it, and the conditions of manufacture. Therefore, for the comparisons made in the following examples it was necessary to use "control" starch of determined viscosity to measure the change in viscosity caused in the modified starch through the different variables. In measuring the viscosities of both the unmodified "control" starches and the modified or treated starches, a Corn Industries Research Foundation viscometer was used.

In all of the following examples, all of the C.I.V. runs were made at 5.0% concentration of starch on the dry substance basis:

*Examples 2–8*

Effect of varying the concentration of hexahydro-1,3,5-tris-acrylyl-s-triazine upon the C.I.V. of starch.

| Example No. | Concentration of hexahydro-1,3,5-tris-acrylyl-s-triazine, percent | Determinations | | Controls | |
|---|---|---|---|---|---|
| | | C.I.V. Max. | C.I.V. 30 min. | C.I.V. Max. | C.I.V. 30 min. |
| 2 | 0.025 | 170 | 155 | 148 | 147 |
| 3 | 0.050 | 192 | 175 | 148 | 137 |
| 4 | 0.075 | 196 | 187 | 155 | 145 |
| 5 | 0.100 | 193 | 178 | 150 | 135 |
| 6 | 0.125 | 225 | 205 | 155 | 145 |
| 7 | 0.150 | 205 | 192 | 140 | [1] 117 |
| 8 | 0.200 | 218 | 204 | 148 | 137 |

[1] 0.025% of the same catalyst used.

In Examples 2–8, a starch slurry of 23–24° Bé. was reacted with the specified amount of hexahydro-1,3,5-tris-acrylyl-s-triazine for 3 hours at pH 5.0 and 110° F. using 0.017% of a 1:1 mixture of potassium persulfate and sodium bisulfite. The results indicate that the C.I.V. maxima were increased 20–70 gram centimeters over the controls.

*Example 9–14*

These examples show the effect of varying the concentration and ratio of potassium persulfate:sodium bisulfite catalyst upon the reaction of hexahydro-1,3,5-tris-acrylyl-s-triazine within starch.

| Ex. No. | Total concentration of catalyst, percent | Concentration of potassium persulfate alone, percent | Ratios of catalyst | Determinations | | Controls | |
|---|---|---|---|---|---|---|---|
| | | | | C.I.V. max. | C.I.V. 30 min. | C.I.V. max. | C.I.V. 30 min. |
| 9 | 0.015 | 0.0075 | 1:1 | 155 | 140 | 155 | 140 |
| 10 | 0.020 | 0.0100 | 1:1 | 190 | 175 | 155 | 140 |
| 11 | 0.025 | 0.0125 | 1:1 | 218 | 204 | 148 | 137 |
| 12 | 0.015 | 0.0150 | 1:0 | 195 | 180 | 155 | 140 |
| 13 | 0.025 | 0.0188 | 3:1 | 175 | 170 | 135 | 115 |
| 14 | 0.025 | 0.0375 | 3:1 | 177 | 170 | 135 | 115 |

In Examples 9–14, a starch slurry of 23–24° Bé. was reacted with 0.10% of hexahydro-1,3,5-tris-acrylyl-s-triazine for 3 hours at pH 5.0 and 110° F. in the presence of the specified amount of catalyst. From these results it appears that the 1:1 catalyst is superior to the 3:1 catalyst, and that a minimum catalyst concentration equivalent to 0.01% of potassium persulfate is necessary to increase the viscosity. The potassium persulfate alone (Example 12) is capable of causing a large increase in the viscosity at 0.015%.

| Ex. No. | Temp., °F. | Bé. | Determinations | | Controls | |
|---|---|---|---|---|---|---|
| | | | C.I.V. Max. | C.I.V. 30 min. | C.I.V. Max. | C.I.V. 30 min. |
| 15 | 110 | 22–23:17 | 210 | 195 | 156 | 135 |
| 16 | 120 | 22–23:17 | 191 | 175 | 145 | 118 |

In Examples 15 and 16, a starch slurry of 22–23° Bé. was reacted at the temperature specified with 0.1% hexahydro-1,3,5-tris-acrylyl-s-triazine and 0.025% of 1:1 potassium persulfate-sodium bisulfite catalyst for 3 hours at pH 5.0 and subsequently diluted to 17° Bé. prior to filtration. From these results it may be seen that dilution of the slurry to a lower ° Bé. did not affect the increase in viscosity obtained at the higher ° Bé., even when the temperature was varied between 110–120° F.

*Examples 17–23*

These examples show the effect of varying the pH of starch slurry in the reaction of hexahydro-1,3,5-tris-acrylyl-s-triazine with starch.

| Example No. | pH | Determinations | | Controls | |
|---|---|---|---|---|---|
| | | C.I.V. max. | C.I.V. 30 min. | C.I.V. max. | C.I.V. 30 min. |
| 17 | 3.0 | 145 | 128 | 150 | 135 |
| 18 | 4.0 | 187 | 165 | 156 | 135 |
| 19 | 4.5 | 185 | 166 | 145 | 118 |
| 20 | 5.0 | 191 | 179 | 145 | 118 |
| 21 | 5.5 | 190 | 175 | 145 | 118 |
| 22 | 6.0 | 183 | 175 | 150 | 135 |
| 23 | 7.0 | 155 | 140 | 155 | 140 |

In Examples 17–23, a starch slurry of about 23° Bé. was reacted with 0.1% hexahydro-1,3,5-tris-acrylyl-s-triazine and 0.025% of 1:1 potassium persulfate-sodium bisulfite catalyst for 3 hours at 110° F. at the pH specified. All controls were determined at pH 5.0. From these results it may be seen that there were viscosity increases only between pH's 4.0–6.0, with the greatest increases at 5.0 and 5.5.

*Examples 24–30*

These examples show the effect of varying the reaction time of hexahydro-1,3,5-tris-acrylyl-s-triazine with starch.

| Example No. | Time in hours | Determinations | | Controls | |
|---|---|---|---|---|---|
| | | C.I.V. max. | C.I.V. 30 min. | C.I.V. max. | C.I.V. 30 min. |
| 24 | 1 | 192 | 182 | 145 | 118 |
| 25 | 2 | 192 | 180 | 145 | 118 |
| 26 | 3 | 191 | 179 | 145 | 118 |
| 27 | 4 | 191 | 184 | 145 | 118 |
| 28 | 5 | 190 | 180 | 145 | 118 |
| 29 | 6 | 190 | 177 | 145 | 118 |
| 30 | 7 | 191 | 178 | 145 | 118 |

In Examples 24–30, four liters of starch slurry of about 23° Bé. were reacted with 0.1% hexahydro-1,3,5-tris-acrylyl-s-triazine and 0.025% of 1:1 potassium persulfate-sodium bisulfite catalyst at pH 5.0 and 110° F. for the time specified. At the end of each hour aliquots of 500 ml. were determined. From these results it may be seen that the reaction was complete by the first hour and changed little subsequently.

*Examples 31–37*

These examples illustrate the effects of various other oxidizing agents.

| Example No. | Type of oxidant | Level of oxidant, percent | Level of NaHSO$_3$, percent | pH | Determinations | | | Controls | | |
|---|---|---|---|---|---|---|---|---|---|---|
| | | | | | C.I.V. max. | C.I.V. 30 min. | APV | C.I.V. max. | C.I.V. 30 min. | APV |
| 31 | KMnO$_4$ | 0.0125 | 0.0125 | 5.0 | 180 | 163 | 1,120 | 160 | 145 | ------ |
| 32 | KMnO$_4$ | 0.0125 | 0.0125 | 5.0 | 192 | 180 | 856 | 160 | 145 | 1,176 |
| 33 | KMnO$_4$ | 0.025 | 0.025 | 5.0 | 180 | 160 | ------ | 151 | 142 | ------ |
| 34 | KClO$_3$ | 0.025 | 0.025 | 5.0 | 185 | 165 | 880 | 161 | ------ | ------ |
| 35 | (NH$_4$)$_2$S$_2$O$_8$ | 0.025 | 0.025 | 5.0 | 190 | 187 | 600 | 140 | 130 | 1,016 |
| 36 | K$_2$Cr$_2$O$_7$ | 0.05 | 0.05 | 5.0 | 173 | 122 | 1,360 | 155 | 138 | 1,320 |
| 37 | KBrO$_3$ | 0.05 | 0.05 | 5.0 | 193 | 180 | 800 | 155 | 138 | 1,320 |

In Examples 31–33 the potassium permanganate was added in an aqueous solution apart from the sodium bisulfite.

In Examples 31 and 33 the permanganate was added first, and in the Example 32 the bisulfite was added first. Subsequent determinations indicated the order of addition was unimportant.

In the Examples 34–37 the oxidant and the sodium bisulfite were added together in solid form. Of these, the ammonium persulfate gave the best results followed by potassium bromate, potassium chlorate, and potassium dichromate. Potassium bromate requires work at concentrations of at least about 0.05%. Potassium dichromate was least satisfactory, because of 30 minute instability and high age paste viscosity, and also because of a reduction of the dichromate to chromic ion, causing a green discoloration in the starch. However, all of these oxidizing agents do have a catalyzing effect.

It is to be understood that the foregoing descriptions have been given only by way of illustration and example, and that changes and alterations in the present disclosure, which will be readily apparent to one skilled in the art, are contemplated as within the scope of the present invention, which is limited only by the claims which follow.

I claim:
1. The process of making a starch derivative which when cooked provides a dispersion of increased viscosity over the original starch comprising providing a starch slurry at a pH of between about 4 and 6 and at a temperature between about 90° F. and about 130° F., reacting said starch with between about 0.02 and about 0.20 of the dry substance weight of starch of hexahydro-1,3,5-tris-acrylyl-s-triazine in the presence of a substantially neutral oxidizing type of catalyst, and then filtering and drying the resultant product.

2. The process as claimed in claim 1 wherein the catalyst is an oxidizing-reducing type of catalyst.

3. The process as claimed in claim 1 wherein the catalyst comprises about 0.01% to about 0.05% of potassium persulfate and up to 0.015% of sodium bisulfite.

4. The process as claimed in claim 1 wherein the starch slurry provided is a corn starch slurry of between about 17° Bé. and about 24° Bé.

References Cited in the file of this patent

UNITED STATES PATENTS 2,910,467    Wimmer _____ Oct. 27, 1959